(No Model.)

W. ADAMS, Jr., & J. MARET.
APPARATUS FOR PRESERVING FISH ALIVE.

No. 445,131. Patented Jan. 20, 1891.

Witnesses:
J. B. McGivr.
D. W. Naylor.

Willis Adams Jr.
James Maret
Inventors by J. N. Moore
Attorney

UNITED STATES PATENT OFFICE.

WILLIS ADAMS, JR., AND JAMES MARET, OF MOUNT VERNON, KENTUCKY; SAID ADAMS ASSIGNOR TO LIZZIE B. ADAMS.

APPARATUS FOR PRESERVING FISH ALIVE.

SPECIFICATION forming part of Letters Patent No. 445,131, dated January 20, 1891.

Application filed August 23, 1890. Serial No. 362,838. (No model.)

*To all whom it may concern:*

Be it known that we, WILLIS ADAMS, Jr., and JAMES MARET, of Mount Vernon, in the county of Rockcastle and State of Kentucky, have invented a new and useful Improvement in Apparatus for Preserving the Lives of Fish and other Aquatic Animals, of which the following, taken in connection with the accompanying drawings, is a specification.

Our invention is an improved apparatus for preserving the lives of fish and other aquatic animals; and the object of our invention is the provision of an inexpensive and efficient apparatus by means of which fish and other animals of like character may be preserved in a live and healthy condition for an indefinite period.

To attain the desired object our invention consists in certain features of construction and combinations of parts, substantially as hereinafter described, and specifically defined by the claims.

We have illustrated our mechanism and described the process in connection with a fisherman's bait or minnow bucket, but may use the mechanism in any suitable place.

Figure 1:
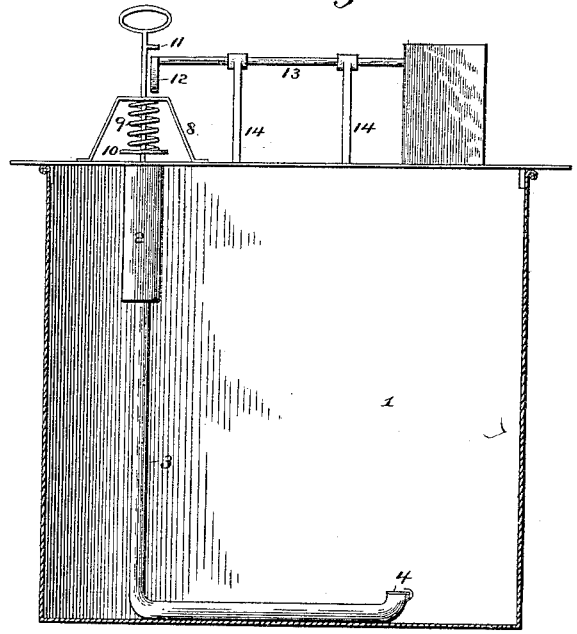
Figure 2:
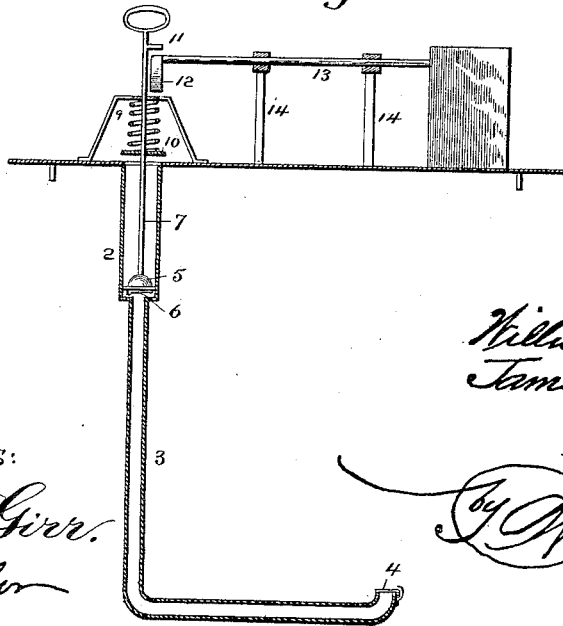

Figure 1 represents a bait-bucket with our mechanism applied, the same being shown in elevation. Fig. 2 represents a vertical section of our improved mechanism.

Referring by numerals to the drawings, the numeral 1 designates a bait-bucket, which in this instance is of cylindrical form, but which may be of any preferred shape. Depending from the top of the bucket is a cylinder 2, leading from which is a pipe 3 of the form of a right angle, the horizontal limb resting on the bottom of the bucket and having the outer end upturned, as shown, and to said end is attached a flap or hinged valve 4, which opens outward to allow the outward passage of air and prevent entrance of water. In said cylinder fits and is adapted to move a piston 5, having a valve 6, and a piston-rod 7 is connected to the piston and passes out of the bucket, being guided by the bail 8. From this construction it is evident that the piston by moving up and down will force fresh air through the pipe to the bucket, and for operating the piston we provide the following-described mechanism: Around the piston-rod we place a coiled spring 9, which bears at its lower end upon the collar 10 and at its upper end against the bail 8, and thus holds the piston down, and on the rod is also formed a lug 11, with which contacts an eccentric or cam 12 for raising the piston. The cam is secured to a shaft 13, mounted in bearings 14, and the shaft is rotated by clock mechanism, preferably, although other means may be employed.

The process and operation of our improved mechanism will be readily understood from the foregoing description and drawings, and may be briefly stated as follows: The vessel contains the water and animals, and as the shaft rotates the cam engages the lug on the piston-rod, elevating the rod until the cam has rotated away from the lug, when the spring forces the piston down, ejecting the air through the tube to the vessel, and thus furnishing oxygen, retaining the water fresh and pure, and preserving the lives of the fish or animals therein.

Our process and apparatus are especially adapted to fish-breeding tanks, aquariums, and the like, as a fresh supply of air is constantly circulated through the water and insures preservation of the animals therein.

Our apparatus can be very easily applied and operated in various ways, is strong, durable, and of simple construction, and can be manufactured at a low price, thus possessing the features desired to commend it as useful and practical.

Having thus described our invention, what we claim is—

1. The herein-described apparatus, consisting of a tank or vessel, a pump and air-pipe leading therefrom into the vessel, a valve in the pump and a valve on the end of the air-pipe, a rotary shaft mounted on the tank and adapted to operate the pump, and mechanism for rotating the shaft, as described.

2. The herein-described apparatus, consisting of a tank or vessel, a pump-cylinder, an air-pipe leading from the pump, a plunger in the cylinder, a spring for forcing the plunger down, a shaft mounted on the tank and adapted to rotate and elevate the plunger, and mechanism for rotating said shaft, thereby insuring a steady and constant flow of air to the tank.

3. The herein-described apparatus, consisting of a tank or vessel, a pump-cylinder therein, an air-pipe leading into the vessel, a spring-actuated plunger, a rotating shaft mounted on the vessel and engaging the plunger, and mechanism for operating the shaft.

4. The herein-described apparatus, consisting of a tank or vessel, a pump-cylinder and air-pipe communicating with the vessel, a plunger, a spring for forcing the plunger down, a rotating shaft mounted on the tank and having a cam or head at one end for engaging the plunger to raise the same, and mechanism for operating the shaft, whereby air is constantly supplied to the tank or vessel.

5. The herein-described apparatus, consisting of a tank, a pump communicating with said tank, having a spring-actuated plunger provided with a lug, bearings on the tank, a shaft mounted in said bearings, having a cam at one end to engage the lug on the plunger, and mechanism connected with the other end of the shaft to rotate the same, substantially as and for the purpose described.

In testimony whereof we have signed our names to this specification, in the presence of two subscribing witnesses, on this 8th day of August, A. D. 1890.

WILLIS ADAMS, JR.
    JAMES MARET.

Witnesses:
 R. A. WELSH,
 D. A. KIRKPATRICK.